United States Patent
Hinton et al.

(10) Patent No.: US 8,769,701 B2
(45) Date of Patent: Jul. 1, 2014

(54) SINGLE TENANT AUDIT VIEW IN A MULTI-TENANT ENVIRONMENT

(75) Inventors: Heather Maria Hinton, Round Rock, TX (US); Neil Ian Readshaw, Parkwood (AU); Katsumi Ohnishi, Nara (JP); Naohiko Uramoto, Aoba-ku (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/604,474

(22) Filed: Sep. 5, 2012

(65) Prior Publication Data
US 2014/0068732 A1    Mar. 6, 2014

(51) Int. Cl.
G06F 21/00    (2013.01)
(52) U.S. Cl.
USPC .......................................................... 726/26
(58) Field of Classification Search
USPC ........................................................... 726/6
See application file for complete search history.

(56) References Cited

U.S. PATENT DOCUMENTS

| | | | |
|---|---|---|---|
| 2007/0101440 A1* | 5/2007 | Bhatia et al. | 726/28 |
| 2007/0186106 A1* | 8/2007 | Ting et al. | 713/168 |
| 2011/0126197 A1* | 5/2011 | Larsen et al. | 718/1 |
| 2011/0276490 A1* | 11/2011 | Wang et al. | 705/50 |
| 2011/0277026 A1* | 11/2011 | Agarwal et al. | 726/8 |
| 2011/0277027 A1* | 11/2011 | Hayton et al. | 726/8 |
| 2012/0011077 A1* | 1/2012 | Bhagat | 705/317 |
| 2012/0011578 A1 | 1/2012 | Hinton et al. | |
| 2012/0066670 A1* | 3/2012 | McCarthy et al. | 717/169 |
| 2012/0096525 A1* | 4/2012 | Bolgert et al. | 726/6 |
| 2012/0166818 A1* | 6/2012 | Orsini et al. | 713/193 |
| 2012/0179646 A1* | 7/2012 | Hinton et al. | 707/607 |
| 2012/0311012 A1* | 12/2012 | Mazhar et al. | 709/201 |
| 2013/0179941 A1* | 7/2013 | McGloin et al. | 726/3 |

FOREIGN PATENT DOCUMENTS

WO    WO2009145987    2/2010

OTHER PUBLICATIONS

Peyton et al., "An Audit Trail Service to Enhance Privacy Compliance in Federated Identity Management", 2007, ACM, pp. 1-13.*

* cited by examiner

*Primary Examiner* — Matthew Smithers
(74) *Attorney, Agent, or Firm* — Jeffrey S. LaBaw; David H. Judson

(57) ABSTRACT

A method correlates audit information in a multi-tenant computing infrastructure. The method leverages a user's authentication to the infrastructure, such as via federated single sign-on (F-SSO) from an identity provider. Preferably, the user's tenant identifier in the environment is derived based on identity information obtained during the F-SSO exchange. This tenant identifier is propagated to one or more other components in the infrastructure that are accessed by the user. As audit event from multiple components in the computing infrastructure are generated, these audit events are annotated with the tenant identifier and stored in an audit repository. In response to a request to view the tenant's audit data, a collection of tenant-specific audit events are then retrieved from the audit repository and displayed in a single tenant view. This approach ensures that audit event information is not leaked inadvertently between tenants.

18 Claims, 6 Drawing Sheets

SINGLE TENANT AUDIT VIEW IN A MULTI-TENANT ENVIRONMENT

BACKGROUND OF THE INVENTION

1. Technical Field

This disclosure relates generally to cloud-based environments and, in particular, to techniques to produce customer-specific audit data for purposes of compliance analysis, reporting, problem determination, and forensics, among others.

2. Background of the Related Art

Businesses often have to provide information to show compliance with different external regulations including government and industry regulations and, in addition, to demonstrate compliance with internal policies and procedures. These external regulations include, for example, the Sarbanes-Oxley (SOX) Act, the Health Insurance Portability and Accountability Act (HIPAA), and the like. Often times, compliance with these and other regulations may be shown using information contained in audit logs maintained by information technology (IT) organizations. For compliance reasons, these audit logs often are maintained for years. Audit logs are useful for checking the enforcement and effectiveness of information technology controls, accountability, and vulnerability, and/or risk analysis. An information technology organization also may use auditing of security related critical activities to aid in forensic investigations, such as security incidents that may occur. When a security incident occurs, an audit log enables an analysis of the history of activities that occurred prior to the security incident occurring. These activities include, who did what, when, where, and how. With the analysis of an audit log, appropriate corrective actions may be taken. Audit logs are typically made available in relational databases to allow easy querying of the information by reporting programs or software to generate operational and trend reports.

While compliance may be seen to ensure the ability to ensure that a security policy is enforced, compliance may also be applied to other types of policy, such as service level agreements (e.g., using timestamps on audit logs to ensure that an overall Service Level Agreement (SLA) is satisfied), legislative compliance (e.g., on control or release of privacy-related information), or even policy management itself (e.g., who changed a policy, when and how, and was it in compliance with the policy for compliance-policy-management). Further, compliance with a particular policy, or a detailed forensics examination of actions within a system, may require more than just "audit" logs. It may also require access to error and trace logs, typically used within the scope of a problem determination examination.

An emerging information technology (IT) delivery model is cloud computing, by which shared resources, software and information are provided over the Internet to computers and other devices on-demand. Cloud computing can significantly reduce IT costs and complexities while improving workload optimization and service delivery. With this approach, an application instance can be hosted and made available from Internet-based resources that are accessible through a conventional Web browser over HTTP.

Emerging cloud environments are being created out of existing IT infrastructures that are being adapted to support cloud-based services. One key characteristic of cloud computing that is different from existing environments is the requirement for so-called "multi-tenant" support, sometimes referred to as multi-customer single deployment. To satisfy this requirement, service providers have to be able to isolate different customer usage of the cloud services. In particular, customers have compliance guidelines that they follow, and need to follow, when using cloud services. These customers look to service providers to support their compliance requirements, and they desire to obtain data from the service providers to use for compliance analysis. The service providers need to supply that data, but at the same time maintain isolation between and among their specific customers that are sharing cloud resources. Typically, IT infrastructures do not allow for separating out compliance data contained in log files and audit records.

In particular, auditing in a multi-tenant environment presents a number of challenges that broadly relate to providing individual tenants with appropriate visibility to audit information. One problem is that audit events in a multi-tenant environment frequently are not easily traceable back to individual tenants. Another problem is that audit logs are not easily disseminated to individual tenants. Moreover, the typical manner in which audit logs are generated and stored does not support the ability to prove that tenant information is compartmentalized. These problems are commonly identified by industry observers and customers alike as inhibitors to wider adoption of cloud computing. One approach to address this problem involves augmenting audit APIs in a cloud operational environment so that logs are annotated with an identifier for each tenant. This approach, while technically feasible and useful, requires changes to software components in the cloud environment to enable them to take advantage of these audit services. The attendant development cost and change management impact may make this approach less competitive in terms of time-to-market.

Thus, there remains a need to provide a multi-tenant audit solution that enables a cloud provider to provide audit services with a single tenant audit view and that sufficient proof that audit information from the tenant is not being leaked between or across tenants.

BRIEF SUMMARY

This disclosure describes a method for correlating multi-component, per-tenant audit information in a multi-tenant computing infrastructure. The method preferably leverages a user's authentication to the infrastructure, which typically occurs through federated single sign-on (F-SSO) from an identity provider. The user's tenant identifier in the multi-tenant computing environment is then derived based on identity information (such as an F-SSO credential or token) obtained during the F-SSO exchange. This tenant identifier is propagated (or otherwise available) to one or more other components in the infrastructure that are accessed by the user. As audit events from multiple components in the computing infrastructure are generated, these audit events are annotated with the tenant identifier and stored in an audit repository. In response to a request (e.g., by a tenant administrator) to view (or otherwise output) the tenant's audit data, a collection of audit events are then retrieved from the audit repository for a user, preferably restricted based on a single tenant identifier that is passed with the request. The resulting display provides the user a "single tenant view," thereby ensuring audit event information is not leaked between or across tenants.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
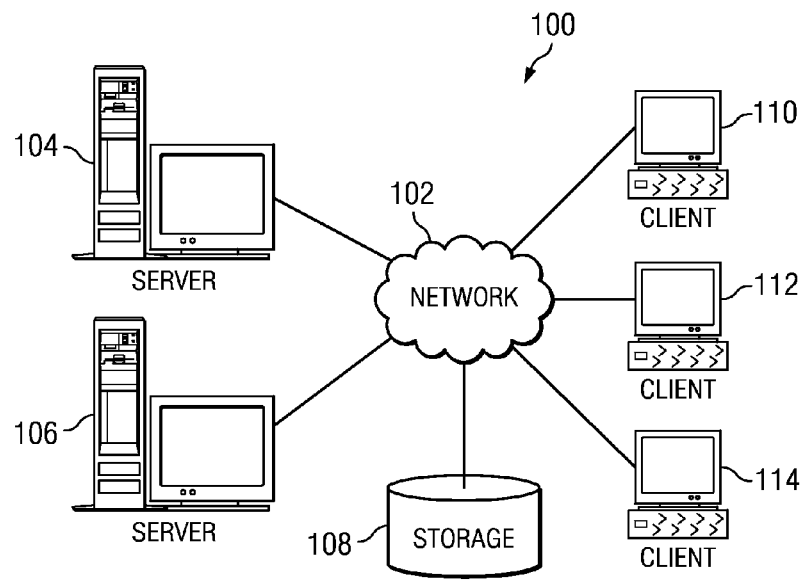
FIG. 1 depicts an exemplary block diagram of a distributed data processing environment in which exemplary aspects of the illustrative embodiments may be implemented.
Figure 2:
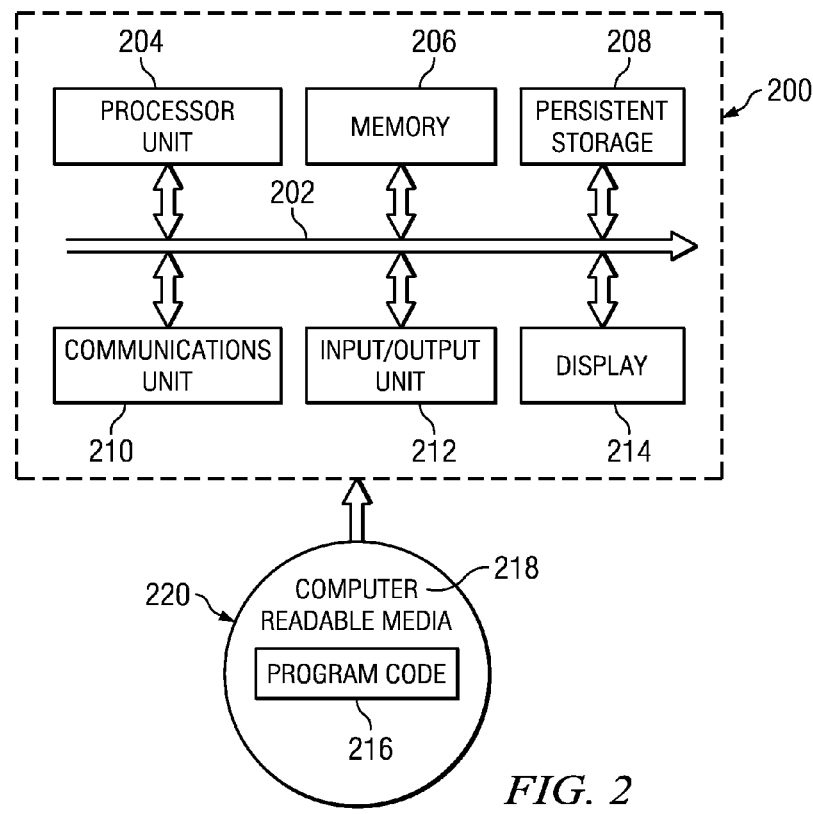
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.
Client-Server Network Model With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Cloud Computing Model

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. A representative cloud computing node is as illustrated in FIG. 2 above. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

Figure 3:
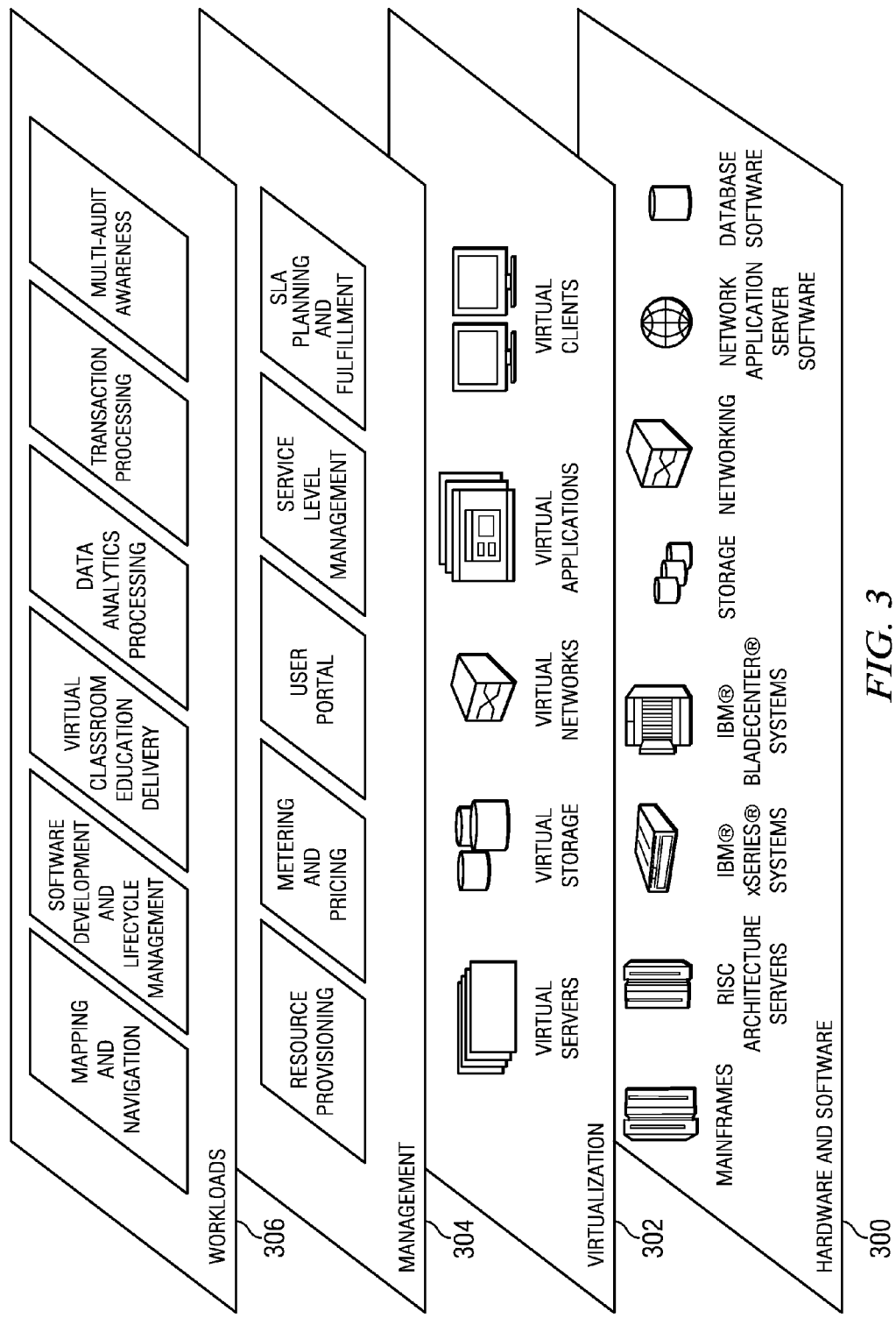
FIG. 3 depicts abstraction model layers of a cloud compute environment according to an embodiment of the invention.

Referring now to FIG. 3, by way of additional background, a set of functional abstraction layers provided by a cloud computing environment is shown. It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and, according to the teachings of this disclosure, multi-tenant audit awareness.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Thus, a representative cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the Tivoli® Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud.

Auditing

Figure 4:
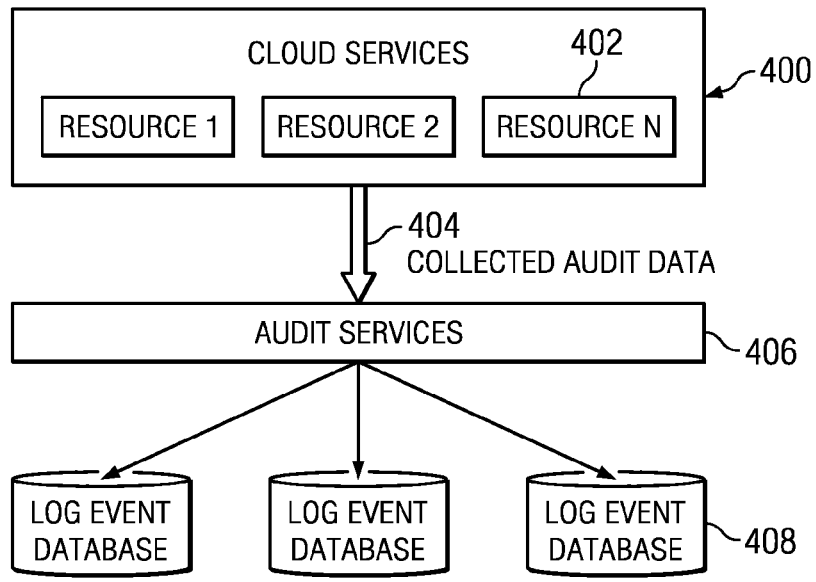
FIG. 4 depicts an existing approach wherein log data is retrieved from audited resources and put into a database for compliance analysis.

FIG. 4 illustrates how log data is retrieved from audited resources that are used to provide cloud services. In this example, the cloud services 400 expose a set of resources 402 (e.g., resources 1-n) hosted in a shared pool of configurable computing resources. Given the cloud paradigm described above, the "resource" should be broadly construed to cover any system, machine, process, program, application, utility, object or data associated therewith. Typically, collected audit data 404 is provided to an audit service 406, which normalizes that data and puts into log event databases 408 to allow for analyzing the data and creating reports that can be used for compliance. Audit service 406 typically comprises a distributed set of machines, programs and associated data structures that collectively provide the service, all in a known manner. As used herein, an audited resource within the cloud services environment is sometimes referred to herein as an operational management product (OMP). In this context, an OMP typically is deployed in a single customer environment and, as such, its associated log data does not include any information that can serve to distinguish that data from similar data generated by other such sources. In this respect, the OMP is said to be "multi-tenant unaware." As a consequence, the audit service (such as shown in FIG. 3) is not set up to support the inclusion with the logged data of a "customer identity." Thus, multi-tenant support for auditing is not available.

Federated Single Sign on (F-SSO) for Cloud Enablement

Often, authentication to a "target application" that is hosted in the cloud is not password-based but rather requires some other authentication approach (e.g., key-based). The target application is one that may also use transport protocols other than HTTP. Thus, for example, there are many file transfer and storage protocols that require support in the cloud environment but that are otherwise not well suited to (or that do not use) HTTP. These include, without limitation, file transfer protocols such as SSH, FTP, and others, and storage protocols such as CIFS, NFS and others. Where the target application is accessed using one or more of these file or storage protocols, it is desirable to enable authentication of a user to the target application within the context of the F-SSO cloud operation. A "cross-protocol F-SSO" solution is described in U.S. Publication No. 2012/0011578, which is commonly-owned.

Figure 5:
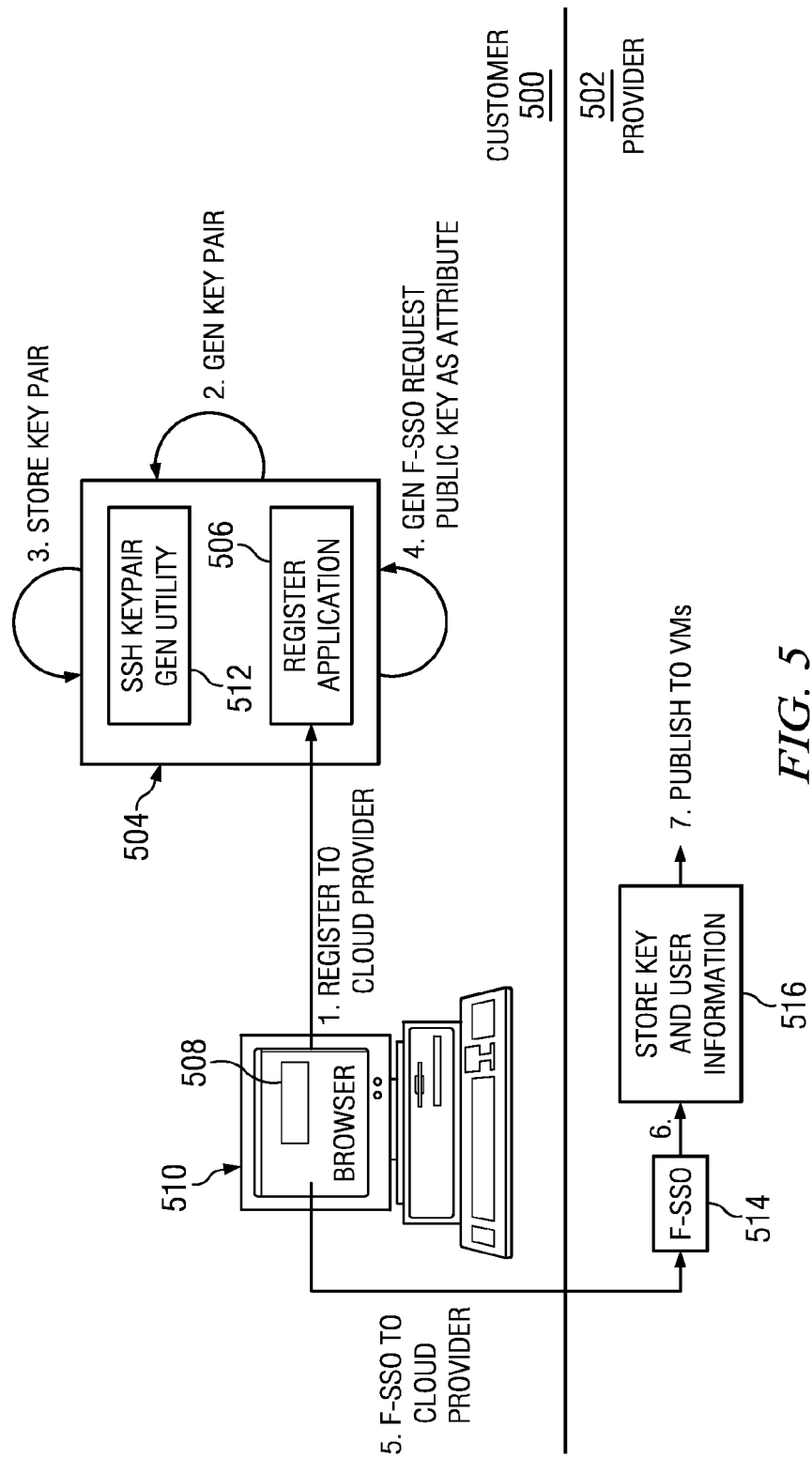
FIG. 5 illustrates how Federated Single Sign-On (F-SSO) can be used in a known manner to provide cross-protocol F-SSO in a cloud environment.

As described in the above-referenced publication, in one embodiment F-SSO (e.g., using SAML) is used to register a user into the cloud and to establish SSH keys for use in later direct SSH access (by the user) to an application executing (in a cloud embodiment) as a virtual machine instance, such as a virtual machine image used for development or test of an application. SSH is used by way of example only, and the reference to a virtual machine is also non-limiting, as a physical machine also may be covered. As illustrated in FIG. 5, an enterprise 500 (represented by the components above the line) is a "customer" of a cloud provider 502. In this example, the enterprise 500 provides a federated identity provider (IdP) function and, to that end, the enterprise includes one or more systems such as a federated identity manager (e.g., IBM Tivoli Federated Identity Manager). The identity manager 504 executes as a server on hardware and software such as described above, or it could be implemented in a virtual machine. The identity manager 504 includes a registration application 506 that provides a cloud registration function using F-SSO. As will be seen, that registration function is augmented according to the teachings herein to provide (a) generation of SSH key pairs (for use in the cloud), and (b) the inclusion of a private key from that pair into an F-SSO SAML assertion. Preferably, the generation of the SSH key pairs occurs as a runtime operation, i.e. while the registration application otherwise registers the user into the cloud provider's environment.

To that end, an end user operates a web browser 508 executing on a user machine 510. At step 1, the end user makes a registration request, which is received by the registration application 506 executing on or in association with the identity manager 504. At step 2, the registration application makes a request to an SSH key pair generation utility 512 to generate an SSH key pair. As is well-known, an SSH key pair comprises a private key, and a public key that is related to the private key by a predetermined mathematical relationship. The key pair generation utility 512 generates the key pair and, at step 3, stores the key pair locally. The key pair is also returned to the registration application 506 which, at step 4, generates an F-SSO assertion. The F-SSO assertion is a SAML assertion that includes the SSH public key as an attribute. The SAML assertion also includes one or more other attributes to be used by the cloud provider 502 to govern the user's actions within the cloud environment, as well as one or more SAML parameters such as "not on or before" or "not on or after" that limit that user's access to the provider or the provider's resources. In this way, the user may be provided access to the cloud provider resources for a given time, or for a given project, etc. The user's private key (from the generated key pair) preferably is returned to the user's machine 510 and optionally a copy is also stored by the registration application.

Continuing with the F-SSO operation, the user's browser 508 is then redirected (e.g., via an HTTP 302 or the like) at step 5 to the cloud provider 502. At the cloud provider 502, the cloud provider 502 validates the SAML assertion using its F-SSO component 514 (as described above with respect to FIG. 3). At step 6, the cloud provider 502 creates a data record about the user in a LDAP (or equivalent) directory 516 and, at step 6, stores the user's public key in that directory for future use by the user. At step 7, the F-SSO component 514 then publishes the public key to one or more deployed virtual or physical machines for authentication purposes to complete the F-SSO process of this disclosure.

The above-described cross-protocol F-SSO technique may be used with other (than SSH) non-HTTP based protocols, such as CIFS. Regardless of the desired access protocol, the user originally "registers" to the cloud provider using an HTTP-based F-SSO protocol, such as SAML, while still preserving the ability of the user to use non-HTTP based file and storage protocols in a seamless fashion.

Multi-Tenant Audit Service with Single Tenant View

With the above as background, the techniques of this disclosure can now be described. As will be seen, this disclosure provides for an enhanced multi-tenant audit service to provides a "single tenant view" that enforces (or provides) a guarantee that audit information is not being leaked between or across tenants in a multi-tenant infrastructure environment.

According to an embodiment, an audit and display method preferably leverages a user's authentication to the infrastructure, which typically occurs through federated single sign-on (F-SSO) from an identity provider, to restrict the audit information that is available to a particular tenant in the computing environment. To this end, preferably the user's tenant identifier in the multi-tenant computing environment is derived based on identity information (such as an F-SSO credential or token) obtained during the F-SSO exchange. This tenant identifier is propagated (or otherwise available) to one or more other components in the infrastructure that are accessed by the user. As audit event from multiple components in the computing infrastructure are generated, these audit events are annotated with the tenant identifier and stored in an audit repository. In response to a request (e.g., by a tenant administrator) to view (or otherwise output) the tenant's audit data, a collection of audit events are then retrieved from the audit repository for a user, preferably restricted based on a single tenant identifier that is passed with the request. The resulting display provides the user a "single tenant view," thereby ensuring audit event information is not leaked between or across tenants.

Figure 6:
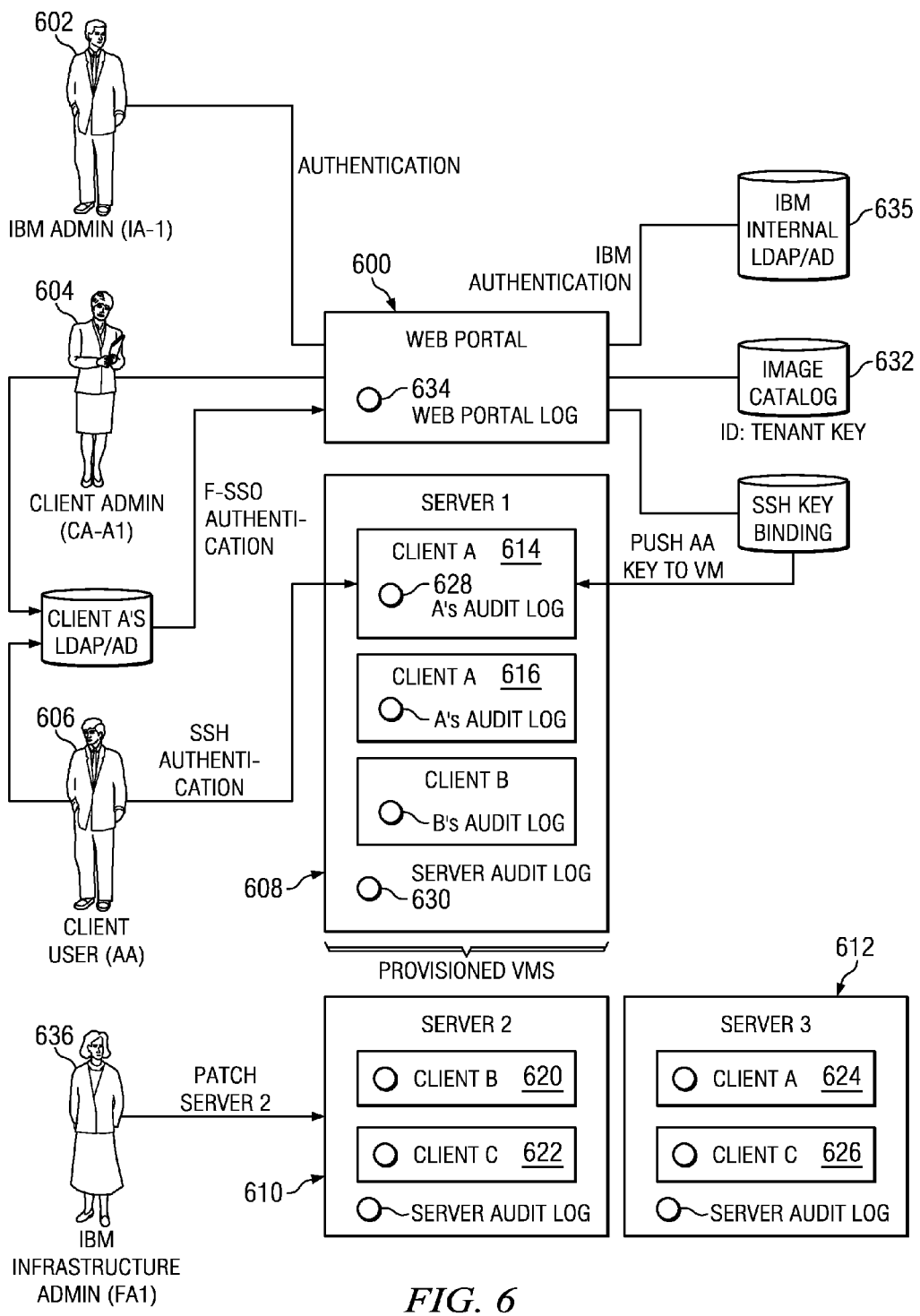
FIG. 6 illustrates a representative multi-tenant cloud operating environment in which the techniques of this disclosure may be implemented.

A typical cloud compute operating scenario is illustrated in FIG. 6, by way of example only. In this scenario, a web portal 600 provides an interface to the cloud service for the various users, which include a service provider administrator 602, a client (service provider customer) administrator 604, and a client user 606. The compute cloud resources include physical servers, such as servers 608, 610 and 612, upon which are provisioned one or more virtual machines. Thus, server 608 includes three virtual machines, with virtual machines 614 and 616 associated to client A, and another VM 618 associated to client B. Server 610 is running two virtual machines, VM 620 associated with client B, and VM 622 associated with client C. Server 612 also is running two virtual machines, VM 624 associated with client A, and VM 626 associated with client C. Each VM is assumed to be generating an audit log, which is client-specific, while the server generates its own audit log. Thus, for example, VM 614 generates an audit log 628 that should be associated only with client A, while the physical server 608 upon which VM 614 executes generates an audit log 630 that includes audit events related to the operation of all of the VMs executing on that server. Thus, audit log 630 (at least in this scenario) necessarily includes audit events that are not limited to a particular client. For example, audit log 630 will include information about the start-up (provisioning) and shut-down of VM instances 614 and 616, as well as information related to the hypervisor hosting these VMs.

As also seen in FIG. 6, the various users (e.g., client administrator 602, client user 604) access the service using the F-SSO approach described above with respect to FIG. 5. The resulting SSH keys are stored in data store 638 and pushed to the virtual machines as previously described.

The problem of audit log contamination across clients (tenants) is exacerbated by the fact that the service provider administrator 602 can take actions that impact multiple clients. More generally, this is the problem that actions that impact the physical environment (below the level of the hypervisor) generally affect (or can affect) multiple customers, while actions above the hypervisor level (i.e., within the virtual environments) typically are customer-specific. Thus, for example, the service provider administrator 602 may log into the web portal 600 and create new VMs for use on behalf of multiple clients. These actions create audit events. Thus, for example, when administrator 602 logs into the 600 portal for client A (and, in this manner, acts on behalf of client A) and requests creation (provisioning) of the VMs 614, 616 and 624, client A-specific audit events are created. These events typically are stored in a file located on the server housing portal 600 and may in turn be copied off-board to a database for long-term storage. Separately, the administrator's log-in to the web portal also generates an audit event, which is stored in a web portal log 634. Likewise, client administrator 604 may log into the portal and perform various administrative actions that generate audit events. The client administrator's log-in event also is recorded in the web portal log 634, and any image provisioning activities (by the client administrator) also are recorded at the server/hypervisor managing the provisioned VMs and may be recorded at the server side of the image catalog log 632 (so that the image catalog may record the "check out for provisioning" of an image). The client user 606 may perform other activities, such as an SSH to a provisioned VM instance, that generates distinct audit events that are captured in the server log as well as in audit log for the specific VM instance that is affected. Separately, additional administrators, such as a service provider infrastructure administrator 636, may be performing other operations (such as patching a particular server) by logging into the server directly; those events are captured in the server audit log of the impacted server but affect all clients whose instances are provisioned on the server. Of course, these are merely example scenarios. Nevertheless, all of these disparate actions and audit events generate (or have the potential to generate) audit logs with data associated with multiple tenants.

Moreover, and as can be seen by the above examples, there are many different roles by which a particular client can access and manage resources within the cloud compute environment. Thus, e.g., the service provider administrator 602 can act directly on client A's behalf, the client's own administrator 602 can act, or the client end user may act. The tenant, however, needs to view all of the actions that impact it (but only those) as if it is operating in its own dedicated environment. This "single tenant view" is provided by this disclosure.

To this end, and as noted above, the F-SSO exchange provides identity information that is or can be linked back to a single tenant in the BSS data model. This disclosure takes advantage of that linkage (e.g., from the F-SSO credential to the key material for use with the non-HTTP-based access protocol) to link audit events to a single tenant. In this manner, identity becomes the means by which tenant affinity is established. Preferably, the identity information is linked to one or more audit event sources including, without limitation, the audit logs from physical servers (and there may be multiple such servers), the audit logs from with the customer VMs (and there may be multiple such virtual machines), web portal logs (including the F-SSO server, and one or more other web servers), and the audit logs from one or more provisioning servers. Some of these audit event sources, such as the audit logs from within the VMs, are single tenant-based; some other of these audit event sources, such as the web portal log, the provisioning server logs, and the like, are inherently multi-tenant-based, i.e., where a single log contains audit events that correspond to multiple tenants. An example of a single-tenant audit log might be an SSH server log, with events showing which users logged on at what date/time, and from what IP address. In this case, the linking mechanism of this disclosure identifies which tenant and which user within that tenant with which that audit event is associated; to that end, the cloud BSS database is queried to determine the association between a unique identifier for a VM (e.g., a VMid) and a tenant and user. In the multi-tenant scenario, the system identifies the associated tenant, preferably at the granularity of individual audit events. This may be achieved by tracking a tenant identifier from the web portal, as such an identifier (or perhaps a derivative thereof) is passed back through the provisioning engine. An example of a multi-tenant audit log might be the audit log from the F-SSO system, which typically contains a tenant identifier and a user identifier. In such case, the audit events record that the user is authenticated as the result of a successful F-SSO exchange with an identity provider (the client's LDAP/Active Directory 635). As another example, the web portal log may only contain the user identifier, while the audit log from the cloud BSS might contain a userid and VMid, and the cloud OSS might contain only VMid. The events here would record which operations in the web portal the user undertakes, e.g., create VM, delete VM, generate key pair, or the like.

Further, one service provider administrator may end up with several different SSH keys, one per tenant, allowing the user's actions to be tied to a single tenant, depending on the SSH key used, but also tracked back to a single user/individual (as opposed to cases where SSH keys are shared and so the granularity of the user is lost).

The mechanism of this disclosure knits together these events by linking the F-SSO identity information back to a single tenant in the BSS model. The strength of trust is improved by use of F-SSO as the chain of events then start with an F-SSO event recognizing authentication using a trusted identity provider (trusted by the customer). The unique identifier for the F-SSO assertion can be passed through to the web portal to extend that chain of trust.

Figure 7:
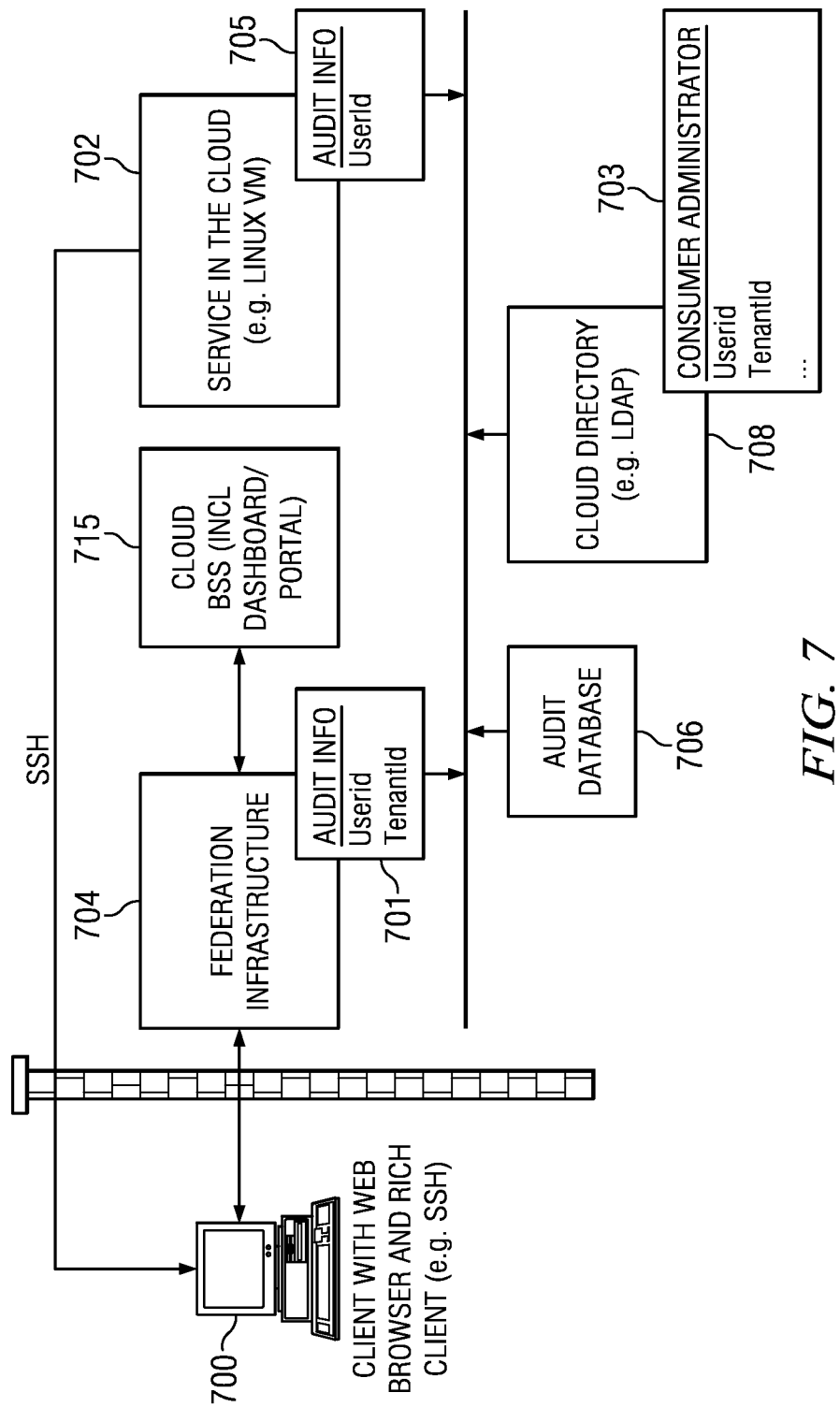
FIG. 7 illustrates a particular use scenario wherein audit events associated with a tenant are associated with identity information such as generated from an F-SSO exchange.

With the above as background, reference should be made to FIG. 7, which illustrates a typical use scenario wherein tenant-specific audit events are linked to a particular cloud customer (tenant). As seen in FIG. 7, user 700 desires to connect to a service in the cloud 702. A federation infrastructure (e.g., an identity manager) 704 provides F-SSO services in the manner described above. The cloud business support services (BSS) expose a web-accessible dashboard or portal 715 that exposes a set of web pages. The cloud infrastructure also includes an audit service that includes audit database 706, and a cloud directory (e.g., LDAP, Active Directory) 708. Other cloud infrastructure details are omitted for simplicity. In operation, the user 700 accesses the cloud via federated SSO exchange, e.g., using the SAML protocol from an identity provider within the customer's own organization. The identity asserted to the cloud services contains an identifier for the cloud tenant. Typically, this cloud tenant identifier (Tenantid) is extracted from the federation partner in the F-SSO messages. The F-SSO infrastructure 704 creates an audit record 701 containing an identifier (Userid) associated with the tenant user, as well as the tenant identifier (Tenantid) for the F-SSO event. The F-SSO infrastructure also generates and distributes the key material for SSO into the cloud services, where it may be stored in a cloud directory store 708. When this key material is stored, another audit record 703 is generated, and this record typically contains the Userid (this time obtained from the cloud directory) and optionally the Tenantid. Typically, the audit record 703 is associated with the customer administrator who provisions the VMs. When the user 700 logs into the cloud service 702, an audit record 705 is generated (e.g., by the SSH daemon) containing the Userid (as obtained from the cloud directory) or as "backtracked" based on the SSH key used and the binding of SSH key to Tenantid as just described. These audit records are centralized in the audit database 706, either when the audit events are created, or through some later collection/normalization process.

Figure 8:
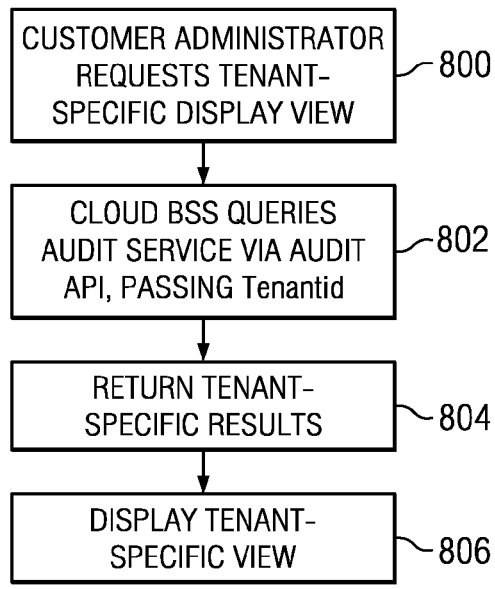
FIG. 8 illustrates a process flow of generating a single tenant view according to this disclosure.

A single tenant view for a customer administrator is created according to the process flow shown in FIG. 8. Such a view is one that does not expose any co-located VMs associated with some other customer, or that does not expose any servers dedicated to other customers or that do not host "self" VMs (the VMs used by the single tenant itself). In a single tenant view, the user preferably can view all server patches applied to all "self" servers (those servers of the entire infrastructure that host self VMs). This provides a patch or health check view of the infrastructure that can be mapped to a "self" policy. This single tenant patch/health check view can also be combined with a view of the tenant's physical environment (located elsewhere) to give an enterprise view of the physical and cloud environment. The single tenant view may be exposed in any convenient interface, such as a web-based console (e.g., as a web page).

The routine begins at step 800 with the customer administrator requesting a customer/tenant-specific view of the customer's audit/log data. Typically, this is accomplished by the user accessing the web-based dashboard or portal in the cloud BSS. As noted above, the identity of the customer administrator is stored in a cloud directory and may also be associated with a tenant identifier, preferably via an attribute in the cloud directory. This was audit record 703 in FIG. 7. At step 802, the cloud BSS queries the cloud audit database, typically via an audit service API. At step 804, the audit service uses the administrator identity (as set forth in the API call) to restrict the results returned to data associated with a single tenant identifier (e.g., the Tenantid associated with the customer administrator). The single tenant view is then displayed at step 806 to complete the process. In particular, the dashboard or portal then provides one or more ways to display and analyze the audit data including, without limitation, tables, graphs, and download of raw data for export to other systems. As noted above, preferably the dashboard displays the tenant-specific audit data as one or more web pages, although this is not a limitation. The resulting single tenant view exposes to the customer administrator that portion of the overall cloud infrastructure (typically, the virtual environments above the hypervisor layer) associated with the tenant, as well as the tenant's management and use activities associated therewith. On the other hand, the single tenant view does not expose to the customer administrator audit details of other customers (i.e., audit events generated as a result of provisioning or use of their virtual environments), or audit details regarding the configuration, administration or management of the resources in the underlying physical layer (i.e., below the hypervisor). Thus, for example, the single tenant view would expose to the customer administrator information about a patch update to a server on which part of the BSS is hosted, or a fix applied to a hypervisor hosting images associated with a subset of customers, but it would not expose the details that a patch was applied to a hypervisor per a different tenant's policy (the patching thus would appears to be done either to the service provider's or the tenant's own patch policy). For example, assume tenant A needs to know that patches are applied, but where they are being applied under a very aggressive schedule that is driven by tenant B's policy, then (from A's perspective) the patching will appear to be driven to the service provider's policy. Likewise, if a patch is applied to a hypervisor that does not host any of tenant A's provisioned instances, then that information is not provided to tenant A as part of its single tenant audit view.

The technique thus provides significant advantages. It facilitates audit visibility in multi-tenant environments yet at the same time ensures that audit information in such an environment is not leaked between or across tenants. Further, the techniques leverages advanced authentication techniques (such as F-SSO) to provide a starting point for auditing tenant transactions. By collecting audit events from various sources, the audit service exposes a rich set of data on which audit service analytics may be applied to enable each tenant to be provided with a compartmentalized, single tenant view of the overall infrastructure with which the tenant is associated, its management thereof, and the tenant transactions that use that infrastructure. By enhancing auditing in a multi-tenant environment, the technique enhances the wider adoption and use of the overall cloud computing environment.

Further, all of the different ways in which a tenant can access the system can be rolled up (linked) and thereby associated to a particular customer identity (e.g., the customer administrator) so that the single display view can be created (and enforced) for all relevant audit events. This is desirable, as a service provider typically does not provide one service provider level administrator per tenant but will have one such administrator managing the infrastructure for all tenants.

Although the technique of splitting (by tenant) of audit data is described above through qualifiers on real-time queries, splitting may also be implemented during periodic batch processing of the audit data. Further, audit events generated by other components, including cloud BSS, cloud OSS and consumer/tenant systems, may also be correlated using the above technique, thus extending the solution (and the scope of information leakage protection).

The audit service may include appropriate systems, subsystems, machines, devices, programs, processes and databases as needed, and these hardware and software resources may be configured from other cloud compute resources.

As used herein, the audit data should be broadly construed as any records, audit data, event messages, and the like, that may be generated by any aspect of the computing environment including, without limitation, software applications, event loggers, audit services, hardware auditing components, kernel modules, and the like. Log data may be generated as a result of the execution of some function, or as a result of a lack of activity. As used herein, the particular data should be broadly construed, and the term "record" should not be construed to be limited to a particular required data format or data structure.

The audit service comprises a set of services (or functions). These services may be integrated with one another in whole or in part. The services or functions typically are implemented in software, stored in computer memory as a set of computer program instructions, and executed by one or more processors as a specialized or dedicated machine. The functions described may be combined together, or one or more functions thereof may be distributed across multiple machines. Programs and databases that implement these functions may be co-located, or they may be located in different network or geographic locations.

The customer/tenant identifiers (IDs) stored may comprise a simple customer number, a name, a hierarchical name, or some other identifier that can be used to identify a customer that is using a cloud service (perhaps with respect to a specific contract).

In any of the above-described embodiments, the customer-specific log data can be used to perform tenant-specific compliance analysis against the data, and to produce tenant-specific compliance reports.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, SAML, WS-Trust, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures other than cloud-based infrastructures. These include, without limitation, simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, and as noted above, the cloud enabling aggregation proxy function is implemented in software, which includes but is not limited to firmware, resident software, microcode, and the like. The data (e.g., the annotated log data, audit records, and the like) can be configured into a data structure (e.g., an array, a linked list, etc.) and stored in a data store, such as computer memory. Furthermore, as noted above, the multi-tenant audit awareness functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the multi-tenant auditing components are implemented in a special purpose computer, preferably in software executed by one or more processors. The associated configuration (security levels, status, timers) is stored in an associated data store. The software also is maintained in one or more data stores or memories associated with the one or more processors, and the software may be implemented as one or more computer programs.

The multi-tenant auditing function may be implemented as an adjunct or extension to an existing audit service, logging service, or access manager solution. The technique also may be implemented in an automated compliance manager solution. One such automated solution is available commercially as Tivoli Compliance Insight Manager, available from IBM Corporation. This solution is a security compliance system, which operates on or across a network within or across an enterprise environment to collect, analyze and archive log data and to produce detailed security reports on information security policy compliance. A compliance manager system typically comprises a server, one or more actuators, a Web-based portal, and a management console. The server collects, archives, normalizes, and reports on log data from audited systems and devices. An actuator is a software component that maintains a secure connection between the server and one or more software agents running on each audited system. Actuator scripts enable the software agent to collect data (such as, without limitation, audit data) from supported platforms, which are also referred to as "event" sources. In operation, devices and systems are instrumented with the software agents. These devices and systems generate logs of user activities, processes, and event every time a person or system interacts with the network. These logs provide a record of all network activities and can be analyzed to show whether user behavior is in compliance with a given policy.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application. Further, while typically the client-server interactions occur using HTTP, this is not a limitation either. The client server interaction may be formatted to conform to the Simple Object Access Protocol (SOAP) and travel over HTTP (over the public Internet), FTP, REST, or any other reliable transport mechanism (such as IBM MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Having described our invention, what we now claim is as follows:

1. A method of correlating multi-component, per-tenant audit information in a multi-tenant computing infrastructure, comprising:
    authenticating a user to the multi-tenant computing infrastructure;
    associating a tenant identifier for use in the multi-tenant computing infrastructure with identity information generated as a result of the user authentication;
    as audit events from one or more components are generated, associating at least some of the audit events with the tenant identifier;
    storing the audit events; and
    in response to a request, returning the audit events that have been associated with the tenant identifier.

2. The method as described in claim 1 wherein the identity information is generated as a result of a federated single-sign on (F-SSO) exchange between an identity provider and an identity manager in the multi-tenant computing infrastructure.

3. The method as described in claim 1 further including providing a display of the audit events that have been associated with the tenant identifier while restricting the display from including audit events associated with at least one other tenant identifier.

4. The method as described in claim 1 wherein the user is one of: a tenant administrator, a user associated with the tenant, and an administrator associated with the computing infrastructure who is acting on the tenant's behalf.

5. The method as described in claim 1 wherein the tenant identifier is derived from an F-SSO authentication credential.

6. The method as described in claim 1 further including propagating the tenant identifier to one or more components in the computing infrastructure that are accessed by the user.

7. Apparatus for correlating multi-component, per-tenant audit information in a multi-tenant computing infrastructure, comprising:
- a processor;
- computer memory holding computer program instructions that when executed by the processor perform a method comprising:
  - authenticating a user to the multi-tenant computing infrastructure;
  - associating a tenant identifier for use in the multi-tenant computing infrastructure with identity information generated as a result of the user authentication;
  - as audit events from one or more components are generated, associating at least some of the audit events with the tenant identifier;
  - storing the audit events; and
  - in response to a request, returning the audit events that have been associated with the tenant identifier.

8. The apparatus as described in claim 7 wherein the identity information is generated as a result of a federated single-sign on (F-SSO) exchange between an identity provider and an identity manager in the multi-tenant computing infrastructure.

9. The apparatus as described in claim 7 wherein the method further includes providing a display of the audit events that have been associated with the tenant identifier while restricting the display from including audit events associated with at least one other tenant identifier.

10. The apparatus as described in claim 7 wherein the user is one of: a tenant administrator, a user associated with the tenant, and an administrator associated with the computing infrastructure who is acting on the tenant's behalf.

11. The apparatus as described in claim 7 wherein the tenant identifier is derived from an F-SSO authentication credential.

12. The apparatus as described in claim 7 wherein the method further includes propagating the tenant identifier to one or more components in the computing infrastructure that are accessed by the user.

13. A computer program product in a non-transitory computer readable medium for use in a data processing system for correlating multi-component, per-tenant audit information in a multi-tenant computing infrastructure, the computer program product holding computer program instructions which, when executed by the data processing system, performs a method comprising:
- authenticating a user to the multi-tenant computing infrastructure;
- associating a tenant identifier for use in the multi-tenant computing infrastructure with identity information generated as a result of the user authentication;
- as audit events from one or more components are generated, associating at least some of the audit events with the tenant identifier;
- storing the audit events; and
- in response to a request, returning the audit events that have been associated with the tenant identifier.

14. The computer program product as described in claim 13 wherein the identity information is generated as a result of a federated single-sign on (F-SSO) exchange between an identity provider and an identity manager in the multi-tenant computing infrastructure.

15. The computer program product as described in claim 13 wherein the method further includes providing a display of the audit events that have been associated with the tenant identifier while restricting the display from including audit events associated with at least one other tenant identifier.

16. The computer program product as described in claim 13 wherein the user is one of: a tenant administrator, a user associated with the tenant, and an administrator associated with the computing infrastructure who is acting on the tenant's behalf.

17. The computer program product as described in claim 13 wherein the tenant identifier is derived from an F-SSO authentication credential.

18. The computer program product as described in claim 13 wherein the method further includes propagating the tenant identifier to one or more components in the computing infrastructure that are accessed by the user.

* * * * *